United States Patent [19]

Meltzer et al.

[11] Patent Number: 5,453,457
[45] Date of Patent: Sep. 26, 1995

[54] GAMMA-RADIATION-RESISTANT POLYCARBONATE COMPOSITION

[75] Inventors: Aaron D. Meltzer; Harald Pielartzik, both of Pittsburgh; Rick Archey, Pleasant Hills, all of Pa.

[73] Assignee: Bayer Corporation, Pittsburgh, Pa.

[21] Appl. No.: 151,224

[22] Filed: Nov. 12, 1993

[51] Int. Cl.⁶ .................. C08K 5/36; G21F 1/10
[52] U.S. Cl. .................. 523/136; 523/137; 524/302; 524/303; 524/304; 524/305; 524/331; 524/332; 524/335; 524/363; 524/310; 524/311; 560/195
[58] Field of Search ............... 524/302, 303, 524/304, 305, 331, 332, 335, 363, 310, 311; 523/136, 137; 560/195

[56] References Cited

U.S. PATENT DOCUMENTS

| | | | |
|---|---|---|---|
| 3,459,787 | 8/1969 | Weesner | 524/302 |
| 3,909,490 | 9/1975 | Mark | 260/45.7 S |
| 4,067,846 | 1/1978 | Mark | 260/45.9 KA |
| 4,699,972 | 10/1987 | Hammer et al. | 524/303 |
| 4,751,283 | 6/1988 | Rosenquist et al. | 528/370 |
| 4,804,692 | 2/1989 | Lundy et al. | 523/137 |
| 4,874,802 | 10/1989 | Lundy et al. | 524/94 |
| 4,880,855 | 11/1989 | Nelson et al. | 523/136 |
| 4,880,856 | 11/1989 | Avakian | 123/136 |
| 4,904,710 | 2/1990 | Nace | 523/137 |
| 4,939,185 | 7/1990 | Nelson et al. | 523/136 |
| 5,159,003 | 10/1992 | Baghaii | 524/303 |
| 5,214,078 | 5/1993 | Powell et al. | 523/136 |

FOREIGN PATENT DOCUMENTS

| | | |
|---|---|---|
| 303894 | 2/1989 | European Pat. Off. |
| 4132629 | 4/1993 | Germany |
| 63-198940 | 8/1988 | Japan |

*Primary Examiner*—Paul R. Michl
*Assistant Examiner*—Olga Asinovsky
*Attorney, Agent, or Firm*—Joseph C. Gil; Aron Preis

[57] ABSTRACT

Esters and polyesters which contain disulfide linkages were found to be effective stabilizers of polycarbonate resin. Accordingly, a polycarbonate composition containing disulfide esters, alone or as a coadditive with a polyether is rendered more resistant to the deterioration resulting upon exposure to gamma radiation.

8 Claims, No Drawings

GAMMA-RADIATION-RESISTANT POLYCARBONATE COMPOSITION

FIELD OF THE INVENTION

The invention relates to polycarbonate molding compositions and in particular to compositions which are rendered resistant to the effects of gamma radiation.

SUMMARY OF THE INVENTION

Esters and polyesters which contain disulfide linkages (herein disulfide esters) were found to be effective stabilizers of polycarbonate resin. Accordingly, a polycarbonate composition containing disulfide esters, alone or as a coadditive with a polyether is rendered more resistant to the deterioration resulting upon exposure to gamma radiation.

The preferred embodiments of the inventive compositions contain polymeric versions of the disulfide esters. These compositions are characterized in that they are less prone to blooming.

BACKGROUND OF THE INVENTION

Polycarbonate resins are generally suitable for molding medical equipment and devices. A variety of medical devices, including blood filters, blood oxygenators and the like, have been molded of polycarbonates. Prior to use, these medical devices must be sterilized, preferably by exposure to ionization radiation, e.g. gamma radiation or electron beam radiation, for a prescribed period of time. While the physical and mechanical properties of polycarbonates are substantially unaffected by this radiation, the exposure results in an often undesirable change in the color, a general yellowing, of the resin.

It has been the object of several researchers in the field to identify the means to reduce this objectionable formation of color. The relevant paent literature includes U.S. Pat. Nos. 4,804,692; 4,874,802 and 4,904,710 which disclosed gamma radiation resistant polycarbonate compositions containing polyether polyols.

Also relevant is 11.08.88-JP198940 which disclosed a polycarbonate composition containing an ester having mercapto group of thio glycolic acid or mercapto-propionic acid and alcohol capable of being sterilized by exposure to radiation. Additionally relevant is DE-OS 41 32 629 which disclosed a polycarbonate composition containing a stabilizing aromatic compound containing sulfonic acid ester substituents; the composition being stabilized against exposure to gamma radiation. A radiation sterilizable composition used for medical devices containing a semi-crystalline polymer, a hindered phenolic stabilizer, phosphite and a thioester (or thioether) has been disclosed in EP 303,894. Enhancing the color stability to sterilization radiation of polymer compositions has been disclosed in U.S. Pat. No. 4,939,185. Accordingly, compounds having defined thioether groups, including dithiane, are said to stabilize aromatic polycarbonate upon exposure to sterilizing radiation. Compounds having sulfone functional groups and thiazole functional groups have been disclosed to enhance the color stability of polycarbonate compositions in U.S. Pat. Nos. 4,880,855 and 4,880,856, respectively.

U.S. Pat. Nos. 4,067,846 and 3,909,490 disclosed flame retardant polycarbonate compositions containing metal salts of sulfonic acids of aromatic sulfides. A cyclic polycarbonate oligomer is disclosed in U.S. Pat. No. 4,751,283. The oligomer may be prepared from monomers containing aromatic disulfides. Also relevant is pending U.S. patent application Ser. No. 07/891,875 filed Jun. 3, 1992, which disclosed a stabilizer entailing an aromatic disulfide. Also relevant is the co-pending patent application Ser. No. 08/018,623(Mo-3913) filed Feb. 17, 1993 which disclosed a stabilizing agent for polycarbonate comprising a particular aliphatic disulfide optionally in conjunction with a polyether polyol. A key advantage of the present invention resides in the lower volatility of the polymeric version of the disulfide esters than low molecular weight compounds.

DETAILED DESCRIPTION OF THE INVENTION

Aromatic polycarbonates within the scope of the present invention are homopolycarbonates and copolycarbonates and mixtures thereof.

The polycarbonates generally have a weight average molecular weight of 10,000–200,000, preferably 20,000–80,000 and their melt flow rate, per ASTM D-1238 at 300° C., is about 1 to about 65 g/10 min., preferably about 2–15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the inventor conform to the structural formulae (1) or (2).

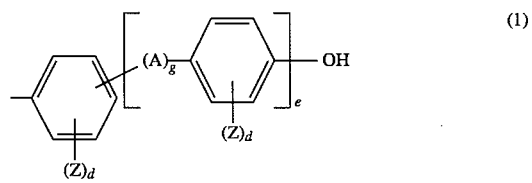

(1)

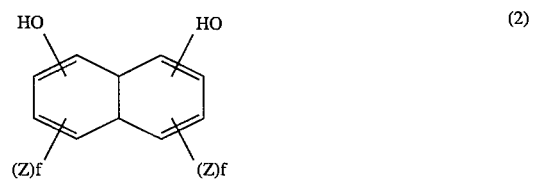

(2)

wherein A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

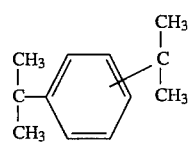

e and g both denote the number 0 to 1;

Z denotes F, Cl, Br or $C_1$–$C_4$-alkyl and if several Z radicals are substituents in one aryl radical, they may be identical or different from one another;

d denotes an integer of from 0 to 4; and
f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis(hydroxy-phenyl)-sulfoxides, bis-(hydroxyphenyl)-sulfides, bis-(hydroxyphenyl)sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxy-phenyl)-propane (bisphenol A), 2,4-bis-( 4-hydroxy-phenyl)-2-methyl-butane, 1,1-bis-(4-hydroxyphenyl)cyclohexane, α,α'-bis-(4-hydroxyphenyl)-p-diiso-propylbenzene, 2,2-bis( 3-methyl-4-hydroxyphenyl)-propane, 2,2-bis-(3-chloro-4-hydroxyphenyl)propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)sulfide, bis-(3,5-dimethyl-4-hydroxyphenyl)-sulfoxide, bis-(3,5-dimethyl-4 -hydroxyphenyl)-sulfone, dihydroxy-benzophenone, 2,4-bis-(3,5-dimethyl-4-hydroxy-phenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis( 4-hydroxyphenyl)-propane, 2,2-bis-(3,5-dimethyl-4-hydroxyphenyl)propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compounds. The following are some examples of polyhydroxyl compounds which may be used for this purpose: phloroglucinol; 4,6-dimethyl-2,4,6-tri-(4-hydroxyphenyl)-heptane; 1,3,5-tri( 4-hydroxphenyl)-benzene; 1,1,1-tri-(4-hydroxyphenyl)-ethane; tri-(4 -hydroxyphenyl)-phenylmethane; 2,2-bis-[4,4-(4,4'-dihydroxydiphenyl)] -cyclohexyl-propane; 2,4-bis-(4-hydroxy-1-isopropylidine)-phenol; 2,6-bis( 2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis( 4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process. Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 g/10 min., respectively. These are products of Miles Inc. of Pittsburgh, Pa. A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein The stabilizer of the present invention is an aliphatic monomer or polymer compound solid at room temperature (72° F.), the molecular structure of which includes at least one disulphide linkage and at least one ester linkage, having a molecular weight of about 500 to 20,000, preferably about 1000 to 5000, a sulfur content derived from disulfide structural units of about 1 to 30, preferably 2 to 10 percent, relative to its weight. Among the preferred embodiments, mention may be made of

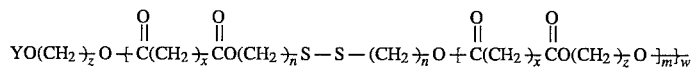

(I)

$$YO(CH_2)_z O + C(CH_2)_x CO(CH_2)_n S - S - (CH_2)_n O + C(CH_2)_x CO(CH_2)_z O +_m +_w$$

or

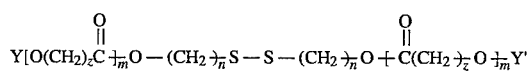

(II)

$$Y[O(CH_2)_z C +_m O - (CH_2)_n S - S - (CH_2)_n O + C(CH_2)_z O +_m Y'$$

or

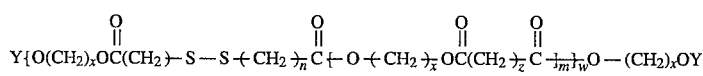

(III)

$$Y\{O(CH_2)_x OC(CH_2) - S - S + CH_2 +_n C + O + CH_2 +_x OC(CH_2)_z C +_m +_w O - (CH_2)_x OY$$

wherein n, x and z independently one of the others denote 1 to 12, preferably 2 to 8, and m and w independently denote 1 to 1000, m is preferably 10 to 50, w is preferably 1 to 20 and where Y and Y' independently one of the other denote hydrogen or a $C_1$–$C_{30}$ alkyl or acyl radicals, pyranyl or sylil groups, preferably hydrogen $C_1$–$C_5$ alkyl or a pyranyl group.

The disulfide esters may be prepared by reacting at least one diacid such as adipic acid, sebacic acid, succinic acid or suberic acid with at least one diol such as hexanediol, butane diol or propylene glycol and a diol sulfide such as 2-hydroxyethyl disulfide, optionally in the presence of a tin catalyst, such as dibutyl tin oxide. The mixture is heated to a temperature above 100° C. and the condensation by-products are driven off under vacuum.

In accordance with the practice of the invention, the disulfide ester is incorporated in the polycarbonate resin by blending following conventional methods which are well known in the art. The amount of disulfide ester to be include in the composition is a positive amount which is sufficient to enhance the resins resistance to gamma radiation induces deterioration as expressed in terms of yellowness index. Preferably, the amount of the disulfide ester is about 0.01 to 5%, more preferably, 0.1 to 1% relative to the weight of the composition.

The disulfide esters are quite miscible with polycarbonate resin and may undergo transesterification reactions with the polycarbonate matrix at the elevated processing temperatures.

In a preferred embodiment of the invention the thermoplastic composition further contains a polyether compound conforming to

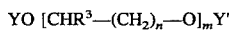

YO [CHR$^3$—(CH$_2$)$_n$—O]$_m$Y' where Y and Y' independently are hydrogen atom or $C_{1-30}$-alkyl or acyl radicals, pyranyl or sylil group, preferably hydrogen, $C_{1-5}$ alkyl or pyranyl radicals, m is 1 to 70 preferably 4 to 50 and n is 1 to 4 preferably 1 and R$^3$ denotes a hydrogen atom, a $C_{1-22}$ alkyl, cycloalkyl, aryl, alkylaryl or cycloalkylaryl radicals, preferably $C_{1-5}$ alkyl radicals. Compounds of this type are known and have been disclosed in U.S. Pat. Nos. 4,804,692; 4,874,802; and 4,904,710 the specification of which are incorporated by reference herein. In the practice of this embodiment of the invention the polyether compound may be incorporated in a positive amount up to 5.0% by weight, preferably 0.1 to 1.5%, said percent being relative to the weight of the composition in the preferred version of the disulfude esters. Characteristically, the preferred embodiments are virtually free of blooming. (Blooming in the present context is a term of art denoting a cosmetic deficiency attributable to inhomogeneity in the chemical makeup of the surface layers).

Conventional additives may be incorporated in the compositions according to the invention in the usual quantities before or during or after preparation of the mixtures. The following are suitable additives: Fillers such as, for example, mineral fillers, plasticizers, fluidizing agents, and stabilizers against the deleterious effects of UV radiation, heat, moisture and oxygen, as well as pigments and flame-retardants.

The invention is further illustrated but is not intended to be limited by the following examples in which all parts and percentages are by weight unless otherwise specified.

Experimental

Compositions in accordance with the invention have been prepared and their properties determined.

Makrolon 2508 resin, a homopolycarbonate based on bisphenol-A having a melt flow index of about 15 g/10 minutes per ASTM D 1238, a product of Miles. A modified Poly(propylene glycol)—Multranol DHP from Miles—having a molecular weight of about 2000 was used where indicated. The several disulfide esters which were used in the course of the experiments were prepared as described below.

The preparation of the compositions followed conventional procedures including tumble blending and extrusion (ZSK-30 twin screw extruder) at about 270° C. The extruded strands were cooled and then chopped into pellets prior to molding by injection (at 280° C.) into 0.100" thick color chips. The chips were subjected to gamma radiation (3 mrad) and the yellowness indices of the as-molded and irradiated chips were measured in accordance with the procedure outlined in ASTM D 1925, taking the measurement approximately 24 hours after the gamma radiation.

In all the examples, the compositions were prepared by blending polycarbonate with the indicated additive, the amount of which is given in the table in weight percent.

The preparation of disulfide ester compounds

Disulfide ester compound 1: Hydroxyethyl disulfide (10 g, 0.088 mol) was placed in a round bottom flask with 80 g (0.70 mol) ε-caprolactone and a catalytic amount of dibutyltin dilaureate. The mixture was heated to 120° C. for 32 hr to yield a poly(caprolactone) with an OH number of 67. The resulting compound on average conforms to

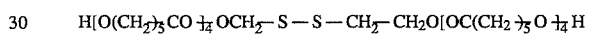

H[O(CH$_2$)$_5$CO $\frac{1}{x}$ OCH$_2$– S — S — CH$_2$– CH$_2$O[OC(CH$_2$ )$_5$ O ]$_x$ H Disulfide ester compound 2:

To a 250 mL reactor were added 2-hydroxyethyl disulfide (11.6 g, 0.075 mol), adipic acid (100 g, 0.685 mol), butanediol (67.5 g, 0.75 mol) and tin (II) chloride (0.1 g). The system was heated to 120° C. 1 hr, and placed under vacuum at 120° C. for 5 hr. The vacuum level was increased so as to maintain water removal. (OH #: 50, acid # 0.24).

The resulting compound on average conforms structurally to

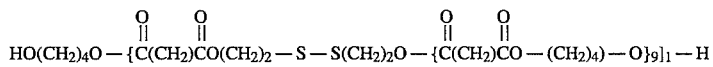

HO(CH$_2$)$_4$O — {C(CH$_2$)CO(CH$_2$)$_2$ — S — S(CH$_2$)$_2$O — {C(CH$_2$)CO — (CH$_2$)$_4$) — O}$_9$]$_1$ — H

Disulfide ester compound 3:

Stearic acid (92.4 g, 0.324 mol) was dissolved in 200 g dry THF, containing 1 mL pyridine, in a 500 mL round bottom flask fitted with a dripping funnel. Thionyl chloride (30 mL, 0.40 mol) was slowly added via the dripping funnel. The mixture was heated to reflux for 3 hr, and the volatiles the dripping funnel. The mixture was heated to reflux for 3 hr, and the volatiles were distilled off. 2-hydroxyethyl disulfide (25 g, 0.162 mol) and triethylamine (50 mL, 0.35 mol) were dissolved in THF and slowly added to the reaction vessel. The solution was heated to reflux and filtered. The filtered off crystals were allowed to cool and re-dissolved in toluene. Carbon black (10 g) was added, the solution heated to reflux and filtered, cooled and the crystals filtered. IR(neat): 1725 cm$^1$. The resulting product conforms to

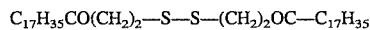

C$_{17}$H$_{35}$CO(CH$_2$)$_2$—S—S—(CH$_2$)$_2$OC—C$_{17}$H$_{35}$

Disulfide ester compound 4:

2,2'-thiodiproprionic acid (25 g, 0.119 mol) were dissolved in 350 g THF, containing 1 mL pyridine, in a 1 L round bottom flask fitted with a dripping funnel. Thionyl chloride (18 mL, 0.25 mol) was slowly added via the dripping funnel. The mixture was heated to reflux for 3 hr, and the volatiles were distilled off. Stearyl alcohol (67.5 mL, 0.25 mol) and triethylamine (35 mL, 0.25 mol) were dissolved in THF and slowly added to the reaction vessel. The solution was heated to reflux and filtered. The solution was allowed to cool and the crystals that formed were filtered. IR(neat): 1725 cm$^1$. The resulting product conforms to

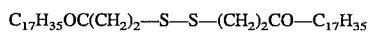

$C_{17}H_{35}OC(CH_2)_2-S-S-(CH_2)_2CO-C_{17}H_{35}$

Disulfide ester compound 5:

2,2'-dihydroxypropionic acid (25 g, 0.119 mol) were dissolved in 350 g THF, containing 1 ml pyridine, in a 1 liter round bottom flask fitted with a dripping funnel. Thionyl chloride (18 ml, 0.25 mol) was slowly added via the dripping funnel. The mixture was heated to reflux for 3 hours and the volatiles were distilled off. Cyclohexylmethanol (21 ml, 0.25 mol) and triethylamine (35 ml, 0.25 mol) were dissolved in THF and slowly added to the magnesium sulfate, filtered and the solvent was removed under reduced pressure. IR (neat): 1725 cm$^{-1}$.

The resulting compound conforms to

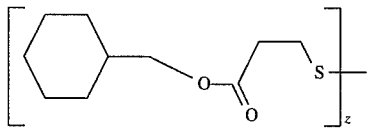

without departing from the spirit and scope of the invention except as it may be limited by the claims.

What is claimed is:

1. A thermoplastic molding composition having an enhanced resistance to deterioration induced by exposure to gamma radiation containing a polycarbonate resin and about 0.01 to 5 percent of a stabilizer selected from the group consisting of

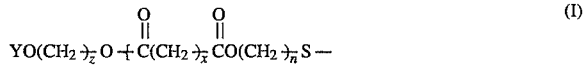

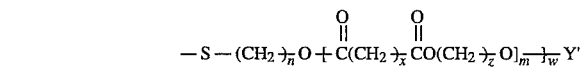

or

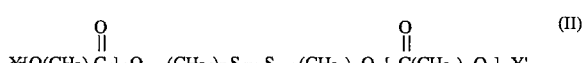

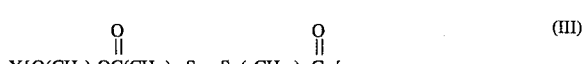

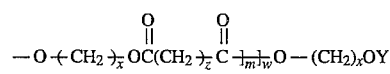

wherein n, x and z independently denote 1 to 12, and m and w independently denote 1 to 1000, and where Y and Y' independently denote hydrogen or a $C_1$–$C_{30}$ alkyl or

TABLE

Yellowness Index of the Polycarbonate Compositions

| | Example | | | | | | | | | |
|---|---|---|---|---|---|---|---|---|---|---|
| | 1 | 2 | 3 | 4 | 5 | 6 | 7 | 8 | 9 | 10 |
| Multranol -DHP | 0.5 | 0.5 | 0.5 | 0.5 | — | 0.5 | — | — | — | 0.5 |
| Disulfide ester #1 | — | — | — | — | — | — | 0.5 | 0.5 | — | — |
| Disulfide ester #2 | — | — | — | — | 0.5 | 0.5 | — | — | — | — |
| Disulfide ester #3 | — | — | 0.1 | — | — | — | — | — | 0.5 | — |
| Disulfide ester #4 | — | — | — | 0.1 | — | — | — | — | — | — |
| Disulfide ester #5 | — | — | — | — | — | — | — | — | — | 0.1 |
| Initial YI | 5.75 | 5.4 | 5.5 | 4.5 | 5.1 | 5.6 | 5.05 | 11.92 | 8.0 | 4.95 |
| After exposure | 28.4 | 21.8 | 18.4 | 19.3 | 10.9 | 14.7 | 12.55 | 19.53 | 16.8 | 17.46 |
| Difference in YI | 22.6 | 16.4 | 12.9 | 14.5 | 8.8 | 9.5 | 6.55 | 7.61 | 8.8 | 12.51 |

The table shows the effect of gamma radiation on compositions of the invention. Examples 1 and 2 are control compositions. The Yellowness index (YI) after exposure and the difference between this value and the YI value before exposure are improved by the addition of the disulfide containing esters and polyesters. While improvements to the final YI and to the difference in YI characterize the compositions which include only the disulfide additives, the further addition of polyether to these compositions improves the color of the polycarbonate composition, and is hence preferred.

Although the invention has been described in detail in the foregoing for the purpose of illustration, it is to be understood that such detail is solely for that purpose and that variations can be made therein by those skilled in the art acyl radicals, pyranyl or sylil groups, said percent being relative to the weight of said composition.

2. The thermoplastic molding composition of claim 1 further containing a positive amount, up to 5 percent by weight of a compound conforming to

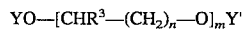

YO—[CHR$^3$—(CH$_2$)$_n$—O]$_m$Y' where Y and Y' independently are hydrogen atom or $C_{1-30}$ alkyl or acyl radicals, pyranyl or sylil group, m is 1 to 70 and n is 1 to 4 and R$^3$ denotes a hydrogen atom, a $C_{1-22}$, aryl, alkylaryl or cycloalkylaryl radicals.

3. A thermoplastic molding composition having an enhanced resistance to deterioration induced by exposure to gamma radiation containing a polycarbonate resin and about 0.01 to 5 percent of an aliphatic stabilizer conforming to

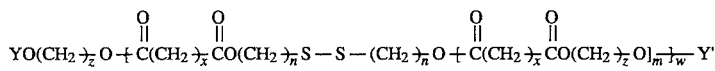

wherein n, x and z independently denote 1 to 12, and m and w independently denote 1 to 1000, and where Y and Y' independently denote hydrogen or a $C_1$–$C_{30}$ alkyl or acyl radicals, pyranyl or sylil groups, said percent being relative to the weight of said composition.

4. A thermoplastic molding composition having an enhanced resistance to deterioration induced by exposure to gamma radiation containing a polycarbonate resin and about 0.01 to 5 percent of an aliphatic stabilizer conforming to

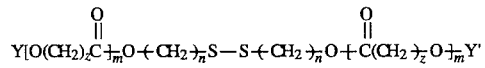

wherein n, x and z independently denote 1 to 12, and m denotes 1 to 1000, and where Y and Y' independently denote hydrogen or a $C_1$–$C_{30}$ alkyl or acyl radicals, pyranyl or sylil groups, said percent being relative to the weight of said composition.

5. A thermoplastic molding composition having an enhanced resistance to deterioration induced by exposure to gamma radiation containing a polycarbonate resin and about 0.01 to 5 percent of an aliphatic stabilizer conforming to

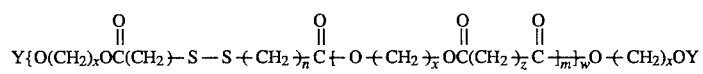

wherein n, x and z independently denote 1 to 12, and m and w independently denote 1 to 1000, and where Y and Y' independently denote hydrogen or a $C_1$–$C_{30}$ alkyl or acyl radicals, pyranyl or sylil groups, said percent being relative to the weight of said composition.

6. The composition of claim 1 wherein n, x and z independently denote 2 to 8.

7. The composition of claim 1 wherein said m denotes 10 to 50 and w is 1 to 20.

8. The composition of claim 1 wherein Y and Y' independently one of the other denote hydrogen, $C_1$–$C_5$ alkyl or a pyranyl group.

* * * * *